(12) United States Patent
Wang et al.

(10) Patent No.: US 12,467,768 B2
(45) Date of Patent: Nov. 11, 2025

(54) METHOD TO CREATE ONLINE VECTORIZED MAPS FOR AUTONOMOUS VEHICLES

(71) Applicant: CONNAUGHT ELECTRONICS Ltd., Tuan (IE)

(72) Inventors: Lihao Wang, Troy, MI (US); Xinhua Xiao, Troy, MI (US); Thomas Heitzmann, Bietigheim-Bissingen (DE); Damien Bouges, Troy, MI (US); He Huang, Troy, MI (US); Peter Groth, Troy, MI (US)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 134 days.

(21) Appl. No.: 18/405,672

(22) Filed: Jan. 5, 2024

(65) Prior Publication Data
US 2025/0224250 A1     Jul. 10, 2025

(51) Int. Cl.
*G01C 21/00*     (2006.01)
*G06V 10/44*     (2022.01)
(Continued)

(52) U.S. Cl.
CPC ..... *G01C 21/3841* (2020.08); *G01C 21/3896* (2020.08); *G06V 10/44* (2022.01); *G06V 10/764* (2022.01); *G06V 20/58* (2022.01); *B60W 60/001* (2020.02); *B60W 2556/40* (2020.02); *B60W 2556/45* (2020.02)

(58) Field of Classification Search
CPC ............ G01C 21/3841; G01C 21/3896; G06V 10/44; G06V 10/764; G06V 20/58; B60W 60/001; B60W 2556/40; B60W 2556/45
See application file for complete search history.

(56) References Cited

U.S. PATENT DOCUMENTS

| | | |
|---|---|---|
| 11,301,722 B2 | 4/2022 | Berry |
| 12,135,222 B2 | 11/2024 | Ferroni |
| 2022/0373354 A1 | 11/2022 | Ferroni |

FOREIGN PATENT DOCUMENTS

| | | |
|---|---|---|
| CN | 115790621 A | 3/2023 |
| CN | 116753936 A | 9/2023 |

OTHER PUBLICATIONS

International Search Report in corresponding International Publication No. PCT/US2024/060160, dated Apr. 15, 2025 (3 pages).

(Continued)

*Primary Examiner* — Ashley L Redhead, Jr.
(74) *Attorney, Agent, or Firm* — Osha Bergman Watanabe & Burton LLP

(57) ABSTRACT

A system for creating online vectorized maps for autonomous vehicles includes an image sensor and an electronic control unit (ECU). The image sensor captures a series of image frames. The ECU includes a memory, a central processing unit (CPU), and a transceiver. The memory stores a semantic segmentation deep learning model and a vectorization post-processing module as computer readable code. The CPU executes the semantic segmentation deep learning model and the vectorization post-processing module to output a vectorized map of an external environment of a vehicle. The transceiver uploads the vectorized map to a server such that the vectorized map can be accessed by a second vehicle that uses the vectorized map to traverse the external environment.

20 Claims, 10 Drawing Sheets

(51) Int. Cl.
*G06V 10/764* (2022.01)
*G06V 20/58* (2022.01)
*B60W 60/00* (2020.01)

(56) References Cited

OTHER PUBLICATIONS

Written Opinion in corresponding International Publication No. PCT/US2024/060160, dated Apr. 15, 2025 (8 pages).

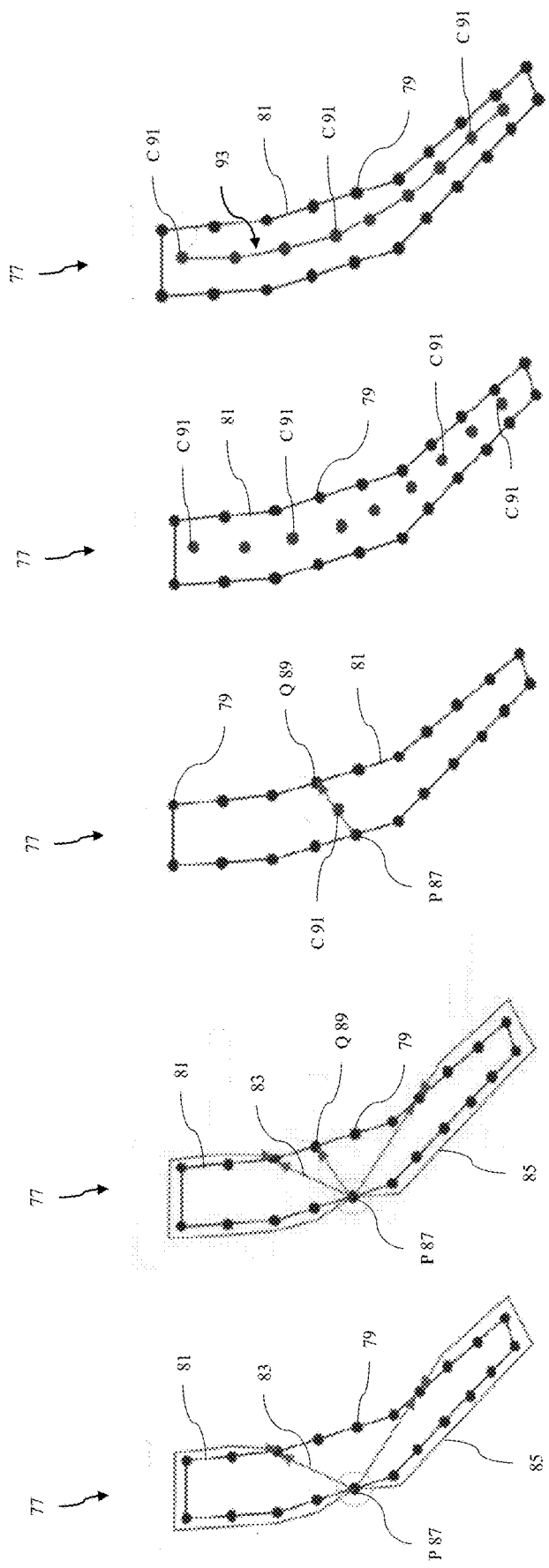

METHOD TO CREATE ONLINE VECTORIZED MAPS FOR AUTONOMOUS VEHICLES

BACKGROUND

An emerging trend in autonomous driving involves eliminating pre-built High Definition (HD) maps and instead detecting vectorized map features directly during driving. This shift is motivated by the expense associated with HD maps, which is typically incurred by mapping companies due to various logistical challenges. Additionally, HD maps often suffer from infrequent updates, with lengthy periods of time occurring before an HD map is updated to contain additional or revised features.

However, it is not trivial to create vectorized maps either. In particular, extracting polylines from polygon contours for vectorized mapping poses a significant challenge. The transition from polygonal shapes to polyline features requires intricate processing, as polygons encapsulate enclosed areas while polylines represent linear features. Achieving a seamless extraction of polylines demands sophisticated algorithms and computational efforts, adding complexity to the task of generating vectorized maps directly from the observed environment during autonomous driving.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for creating online vectorized maps for autonomous vehicles includes an image sensor and an Electronic Control Unit (ECU). The image sensor captures a series of image frames. The ECU includes a memory, a Central Processing Unit (CPU), and a transceiver. The memory stores a semantic segmentation deep learning model and a vectorization post-processing module as computer readable code. The CPU executes the semantic segmentation deep learning model and the vectorization post-processing module to output a vectorized map of an external environment of a vehicle. The transceiver uploads the vectorized map to a server such that the vectorized map can be accessed by a second vehicle that uses the vectorized map to traverse the external environment.

A method for creating online vectorized maps for autonomous vehicles includes capturing a series of image frames of features in an external environment of a vehicle. The method further includes storing a semantic segmentation deep learning model and a vectorization post-processing module on a memory in the form of computer readable code. In addition, the method includes outputting, with the semantic segmentation deep learning model, a Bird's Eye View (BEV) map of the external environment of the vehicle with semantic masks superimposed on digital replicas of features that appear in the BEV map. Furthermore, the method includes extracting, with the vectorization post-processing module, polygon contours for all the semantic masks in the BEV map. The method also includes extracting center polylines of polyline objects from the polygon contours with the vectorization post-processing module. Subsequently, the vectorization post-processing module outputs the vectorized map of the external environment of the vehicle, and a transceiver uploads the vectorized map to a server such that the vectorized map can be accessed by a second vehicle that uses the vectorized map to traverse the external environment.

Other aspects and advantages of the claimed subject matter will be apparent from the following description and appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIGS. 3B-3H depict a process of extracting polylines from polygon contours using a system depicted in FIG. 3A in accordance with one or more embodiments disclosed herein.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention as described herein are directed towards a system for creating online vectorized maps for autonomous vehicles. The system may create maps of any paved or otherwise upkept environment including parking lots, neighborhood streets, shopping centers, and roadways without departing from the nature of this specification. With regard to the specific context of parking lots, which may be indoors, outdoors, enclosed, unenclosed, and above or below the surface of the earth, affordable and precise vectorized maps are difficult to create in an efficient manner, as the process of vectorizing a polygon is computationally intensive. In this vein, the process of extracting polylines from polygon contours may be particularly wasteful if performed by way of traditional feature extraction methods. This is because, as discussed above, polylines are long and thin objects that may be difficult to identify and/or represent without additional context regarding their location. That is, for example, it may be difficult for an object detection algorithm to identify a polygon representing a parking line without also being aware that the parking line resides in the context of a parking lot, or a large, paved surface. Due to these challenges, it is desirable to quickly and easily identify objects that may be represented as polylines, rather than polygons, and to replace the polygons on the resulting vector maps with their polyline counterparts.

Figure 1:
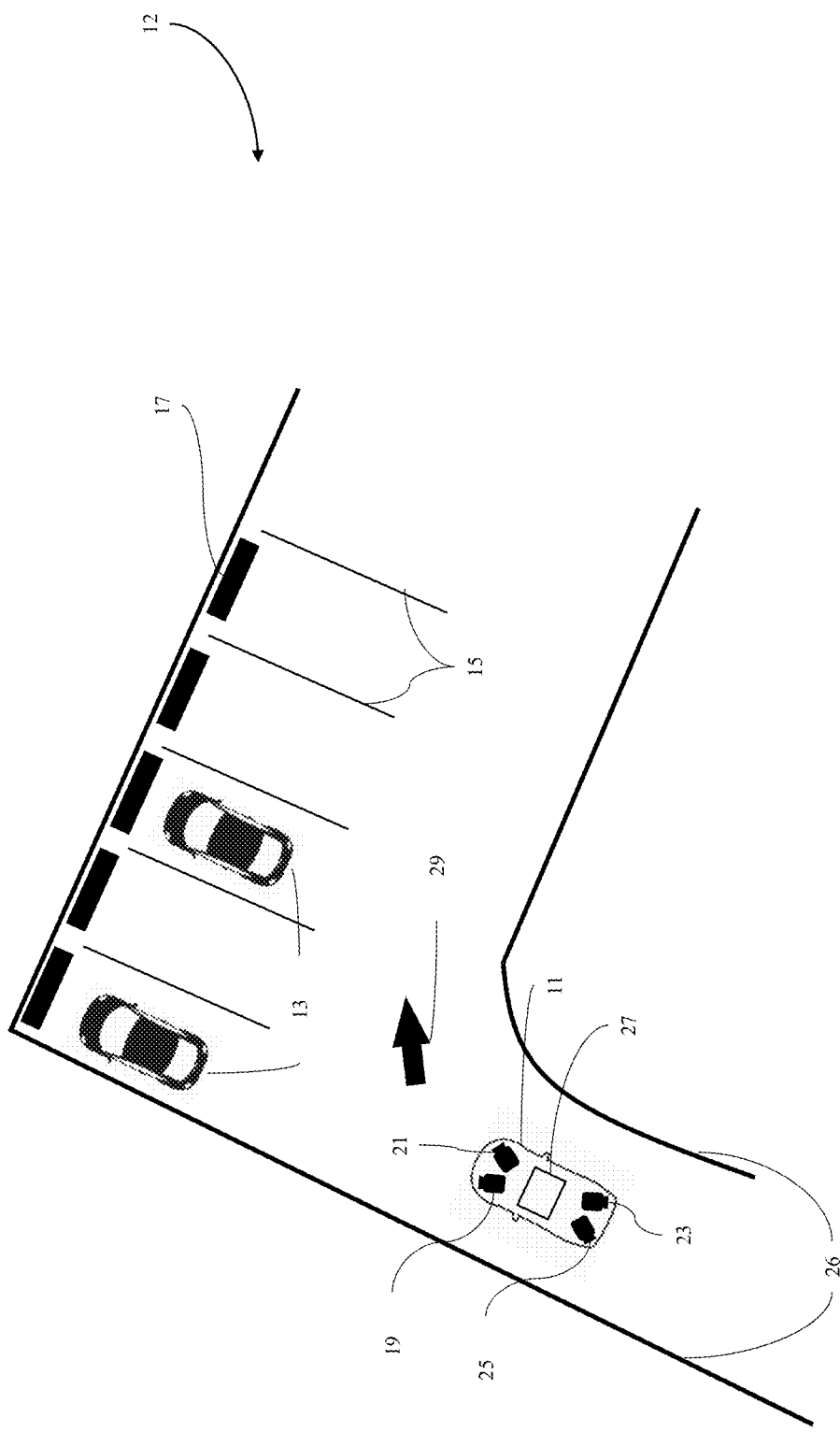
FIG. 1 depicts a vehicle traversing an environment in accordance with one or more embodiments disclosed herein.

FIG. 1 shows a schematic diagram illustrating an example of an urban environment 12 in accordance with one or more embodiments of the invention. In general, urban environments 12 are configured in a myriad of ways. Therefore, the urban environment is not intended to limit the particular configuration of the system for creating online vectorized maps. Primarily, an urban environment 12 is a paved region of land that may be privately owned and maintained by a corporation, or publicly owned and maintained by a governmental authority. The urban environment 12 may include parking lines 15, or painted stripes, that serve to demarcate a location for a user to park or otherwise stop a vehicle's motion for a period of time. Further, the urban environment 12 is depicted in FIG. 1 as an "L" shape where two rectangles are joined together at a right angle. However, the urban environment 12 may be formed of one or more simple geometric shapes that combine to form an overall complex shape (i.e., a square attached to a rectangle to form a "T" shape), and can include multiple entrances and exits. In addition, the urban environment 12 can contain a plurality of features disposed in an external environment of the vehicle 11.

Figure 4A:
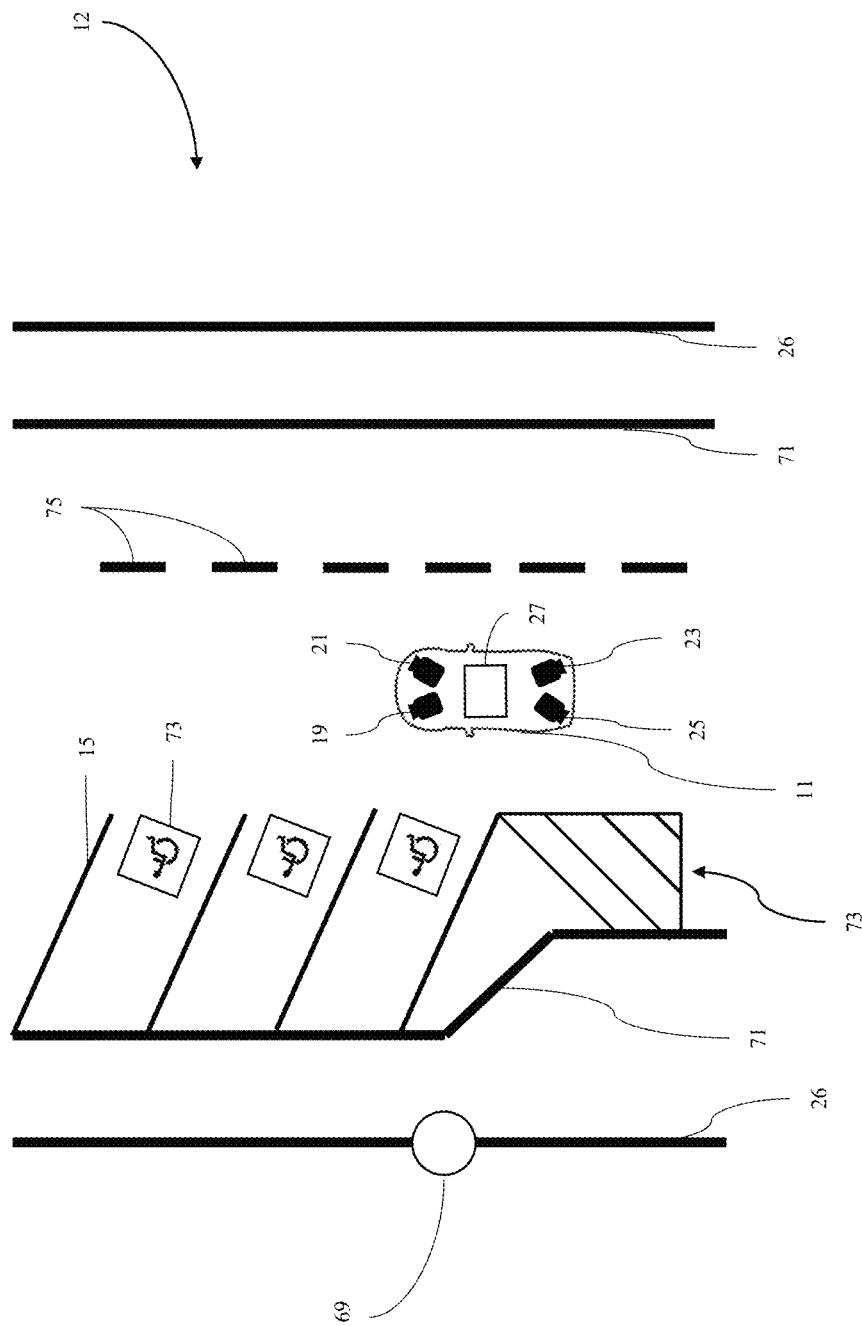
FIGS. 4A-4D depict a visual representation of a process for extracting polyline features in accordance with one or more embodiments disclosed herein.

Features disposed in the external environment of the vehicle may include parking lines 15, pavement arrows 29, pillars (e.g., FIG. 4A), lane dividers (e.g., FIG. 4A), parking blocks 17, curbs (e.g., FIG. 4A), walls 26, parked vehicles 13, and pavement markings (e.g., FIG. 4A). Parking lines 15 are lines painted onto the pavement of the urban environment 12 to demarcate a space that a vehicle 11 may park. The parked vehicles 13 belong to other users but are not formed on the vectorized map of the urban environment 12 because the parked vehicles 13 may or may not be present depending on the use of the urban environment 12. Pavement arrows 29 are painted markings on the pavement in the shape of an arrow to indicate the direction a vehicle 11 should travel. Pillars (e.g., FIG. 4A) are vertical and cylindrical columns of stone and/or metal and/or wood used as a support for a structure, and are commonly used in parking structures to provide support to the structure. Lane dividers (e.g., FIG. 4A) are lines on the pavement of the urban environment 12 which define a lane that a vehicle 11 can travel in. In addition, different lane dividers (e.g., FIG. 4A) can hold different meanings. For example, white lane dividers indicate that vehicles 11 traveling on either side of the dividers travel in the same direction, while yellow lane dividers indicate that vehicles 11 traveling on either side of the dividers travel in opposite directions. Parking blocks 17 are small barriers, typically made of concrete, plastic, or metal, which prevent the wheels of a vehicle 11 from driving over the edge of a parking space and/or driving over the curb (e.g., FIG. 4A), and/or colliding into a wall 26. Curbs (e.g., FIG. 4A) are the edge where a raised sidewalk or median meets a road and/or the pavement that a vehicle 11 drives on. Pavement markings (e.g., FIG. 4A) may include painted symbols on the pavement, such as handicapped parking spot markings and/or a plurality of striped painted lines on the pavement indicating that vehicles 11 cannot park at the marked location.

The process of creating online vectorized maps occurs in real time as a vehicle 11 is driving in an urban environment 12. As the vehicle 11 traverses the urban environment 12, at least one image sensor (e.g., FIG. 3A) captures a series of image frames that include a view comprising features disposed in the external environment of the vehicle 11. As shown in FIG. 1, the vehicle includes a first camera 19, a second camera 21, a third camera 23, and a fourth camera 25. The cameras 19-25 are imaging sensors (e.g., FIG. 3A) configured to capture the series of image frames in the visible light wavelength and/or the infrared light wavelength. However, the at least one image sensor (e.g., FIG. 3A) may alternatively be embodied as Light Detection and Ranging (LiDAR) sensors, radar sensors, ultrasonic sensors, or infrared sensors without departing from the nature of the specification. Additionally, alternate embodiments of the vehicle 11 are not limited to comprising only four cameras, and may include one or more of the previously stated image sensors (e.g., FIG. 3A).

An Electronic Control Unit (ECU) 27 receives the series of image frames via a data bus 33 from the cameras 19-25, where the image frames include a view of features disposed in the external environment of the vehicle 11. The ECU 27 is described further in relation to FIG. 2, and includes a central processing unit (e.g., FIG. 2), a memory (e.g., FIG. 2), and a transceiver (e.g., FIG. 2), all of which is described in greater detail below. The ECU 27 houses a mapping engine (e.g., FIG. 3A), which is also explained in further detail below, that converts the series of image frames captured by the cameras 19-25 into an overhead Bird's Eye View (BEV) map with semantic masks superimposed on digital replicas of the plurality of features that appear in the BEV map. A semantic mask labels each pixel in the BEV map according to the semantic class of a feature that a pixel is located on. All pixels associated with the same semantic class are grouped together, thereby creating a semantic mask (i.e., a silhouette of every feature present in the BEV map). Semantic classes include parking lines 15, pavement arrows 29, pillars (e.g., FIG. 4A), lane dividers (e.g., FIG. 4A), parking blocks 17, curbs (e.g., FIG. 4A), walls 26, parked vehicles 13, and pavement markings (e.g., FIG. 4A). The mapping engine (e.g., FIG. 3A) extracts a plurality of polygon contours and the polylines of all the semantic masks in the BEV map to create a vectorized map. The vectorized map can be made entirely onboard the vehicle 11, and/or the image data may be transmitted to a server (e.g., FIG. 2) which creates a vectorized map in the same way as discussed above, and the server (e.g., FIG. 2) transmits the vectorized map to the vehicle 11.

Figure 2:
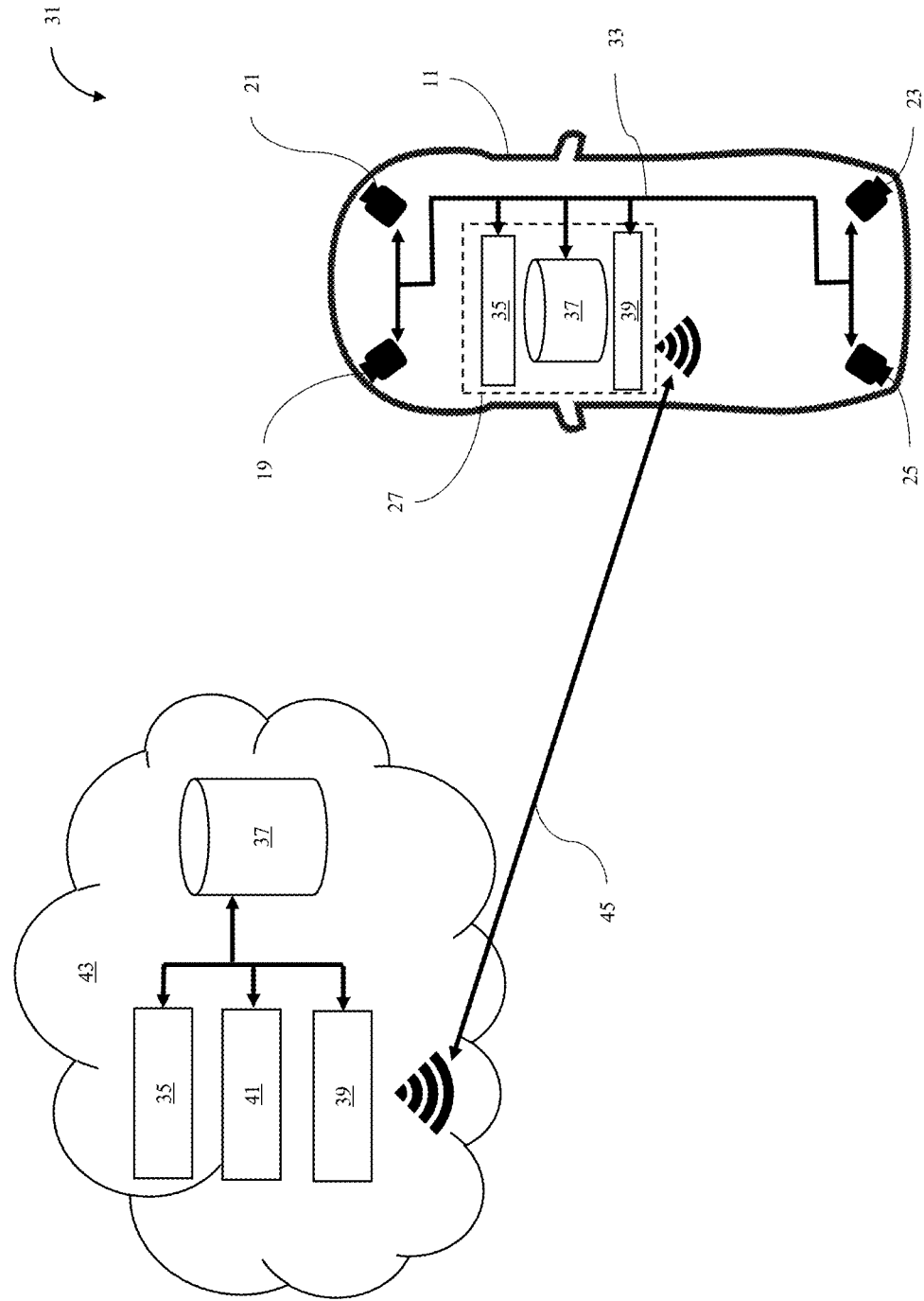
FIG. 2 shows a system in accordance with one or more embodiments disclosed herein.

Turning to FIG. 2, FIG. 2 shows an example embodiment of a system in accordance with one or more embodiments disclosed herein. As depicted in FIG. 2, the system 31 includes a vehicle 11 and a server 43. The vehicle 11 may be a passenger car, a bus, or any other type of vehicle 11 without departing from the nature of this specification. As shown in FIG. 2, a vehicle 11 includes a first camera 19, a second camera 21, a third camera 23, a fourth camera 25, and an Electronic Control Unit (ECU) 27. The ECU 27 includes a Central Processing Unit (CPU) 35, a memory 37, and a transceiver 39. The memory 37 is configured to store a mapping engine (e.g., FIG. 3A) which is formed by computer readable code. In addition, the memory 37 includes a non-transient storage medium, such as flash memory, Random Access Memory (RAM), a Hard Disk Drive (HDD), a Solid State Drive (SSD), a combination thereof, or equivalent. The computer readable code may, for example, be written in a language such as C++, C#, Java, MATLAB, or equivalent computing languages suitable for creating a vectorized map of an external environment of a vehicle 11.

The CPU 35 is formed by one or more processors, integrated circuits, microprocessors, or equivalent computing structures that serve to execute the computer readable instructions that form the mapping engine (e.g., FIG. 3A) stored on the memory 37. After creating the vectorized map by way of the CPU 35 and memory 37, the vectorized map can be transmitted by the transceiver 39 to the server 43. As described herein, a transceiver refers to a device that performs both data transmission and data reception processes, such that the transceiver 39 encompasses the functions of a transmitter and a receiver in a single package. In this way, the transceiver 39 includes an antenna (such as a monitoring photodiode), and a light source such as an LED, for example. Alternatively, the transceiver 39 may be split into a transmitter and receiver, where the receiver includes sensors for detecting a signal and its constituent properties, and the transmitter includes devices to transmit a signal with specific properties (e.g., wavelength, amplitude, frequency, etc.). The server 43 similarly includes a transceiver 39, and the transceiver of the server 43 and the transceiver of the vehicle 11 form a wireless data connection 45 that allows for the transfer of data between the server 43 and the vehicle 11. To this end, the wireless data connection 45 may be embodied as a cellular data connection (e.g., 4G, 4G LTE, 5G, and contemplated future cellular data connections such as 6G). Alternatively, the wireless data connection 45 may include forms of data transmission including Bluetooth, Wi-Fi, Wi-Max, Vehicle-to-Vehicle (V2V), Vehicle-to-Everything (V2X), satellite data transmission, or equivalent data transmission protocols.

The server 43, similar to the vehicle 11, includes a CPU 35, a transceiver 39, and a memory 37. In addition, the server 43 includes a Graphics Processing Unit (GPU) 41, which is a specialized electronic circuit that can increase the speed and efficiency of processing the series of image frames of the external environment of the vehicle 11. The vehicle may optionally include a GPU 41 as well, depending on manufacturing constraints. Because the server 43 includes the CPU 35, the GPU 41, the memory 37, and the transceiver 39, the creation of the vectorized map can be performed either onboard the vehicle 11 or on the server 43. In the case that the server 43 is designated to create the vectorized map, the server 43 receives a series of image frames that include a view comprising features disposed in the external environment of the vehicle 11 captured by the cameras 19-25. The series of image frames are received on the server via the data connection 45. The memory 37 of the server stores the mapping engine (e.g., FIG. 3A) in the form of computer-readable code which is processed by the CPU 35 and the GPU 41 of the server 43. The transceiver 39 of the server 43 transmits the vectorized map to the vehicle 11 through the data connection 45. Alternatively, the vectorized map can be designated to be created solely onboard the vehicle 11 without communication with the server 43. One advantage of creating the vectorized map on the server 43 is that the processing may be more cost efficient than equipping every user vehicle 11 with a GPU 41. On the other hand, creating the vectorized map onboard the vehicle 11 advantageously implies that the vehicle 11 is not required to sustain a wireless data connection 45 with the server 43 (i.e., such as when a vehicle 11 is in an underground parking structure where a signal connecting the vehicle 11 to the server cannot be achieved).

Turning to FIGS. 3A-3H, FIG. 3A shows a mapping engine 68 used to create a vectorized map 67 of an external environment of a vehicle 11. Consistent with the description of FIG. 2, the mapping engine 68 may operate on or in conjunction with devices of both the server 43 and the vehicle 11. For example, the mapping engine 68 may be hosted entirely on a memory (e.g., FIG. 5) of the vehicle 11, or split between the vehicle 11 and the server 43.

Figure 3A:
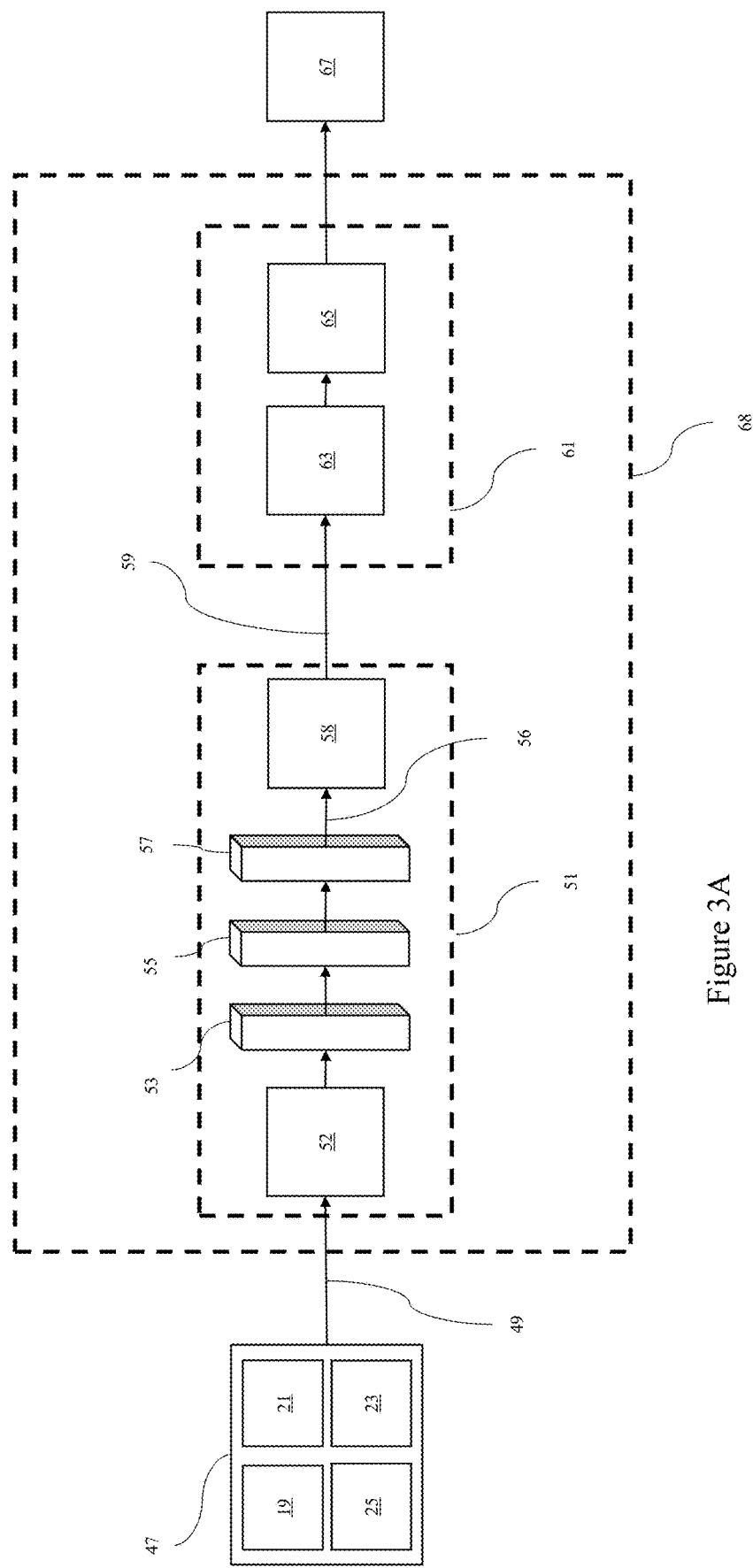
FIG. 3A depicts a flowchart of a system in accordance with one or more embodiments disclosed herein.

As shown in FIG. 3A, the mapping engine 68 receives input of sensor data 49 from at least one image sensor 47, which includes the cameras 19-25. The sensor data 49 includes a series of image frames of an external environment of a vehicle 11, where the series of image frames are captured by the cameras 19-25. The sensor data 49 is input to the mapping engine 68, and is initially processed in a semantic segmentation deep learning model 51. Inputting the sensor data 49 may include, for example, transmitting the sensor data 49 via the bus 33 from the cameras 19-25 to the ECU 27 in cases where the 68 is hosted on the vehicle 11. Otherwise, inputting the sensor data 49 includes transmitting the sensor data 49 over the wireless data connection 45 from the vehicle 11 to the server 43.

The semantic segmentation deep learning model 51 includes a camera encoder 52, an input layer 53, one or more hidden layers 55, and an output layer 57. The camera encoder 52 serves to convert the visual information captured by the cameras 19-25 into a digital format. In this way, the camera encoder 52 allows for the sensor data 49 to be processed in order to create a vectorized map 67. The input layer 53 serves as an initial layer for the digital sensor data 49. The one or more hidden layers 55 includes layers such as a convolution layer that convolves the input sensor data 49 with learnable filter, extracting low-level features such as the outline of features and the color of features. Subsequent layers aggregate these features, forming higher-level representations that encode more complex patterns and textures associated with the features. Through training, the deep learning model refines weighted values associated with determining different types of features in order to recognize semantically relevant features for different classes of features.

The one or more hidden layers 55 may further include a pooling layer, which reduces the dimension of outputs of the convolution layer into a down-sampled feature map. For example, if the output of the convolution layer is a feature map with dimensions of 4 rows by 4 columns, the pooling layer may down sample the feature map to have dimensions of 2 rows by 2 columns, where each cell of the down sampled feature map corresponds to 4 cells of the non-down sampled feature map produced by the convolution layer. The down-sampled feature map allows the feature extraction algorithms to pinpoint the general location of various objects detected with the convolution layer and filter. Continuing with the example provided above, an upper left cell of a 2×2 down-sampled feature map will correspond to a collection of 4 cells occupying the upper left corner of the feature map. This reduces the dimensionality of the inputs to the semantic segmentation deep learning model 51, such that an image comprising multiple pixels can be reduced to a single output of the location of a specific feature within the image. In the context of the various embodiments described herein, a feature map may reflect the location of various features in the series of image frames.

The number of convolution layers and pooling layers of the hidden layers 55 depend upon the specific network architecture and the algorithms employed by the semantic segmentation deep learning model 51, as well as the number and type of features that the semantic segmentation deep learning model 51 is configured to detect. For example, a deep learning model flexibly configured to detect multiple types of features will generally have more layers than a deep learning model configured to detect a single feature. Thus, the specific structure of the semantic segmentation deep learning model 51, including the number of hidden layers 55, is determined by a developer of the semantic segmentation deep learning model and/or the system 31.

Continuing with FIG. 3A, the final layers of the convolution operation employ the learned features to make predictions about the identity of the features. Accordingly, the output layer 57 is a series of annotated image frames 56 which include the sensor data 49 with the determined semantic identity of the features present in each image frame. This process enables the semantic segmentation deep learning model 51 to discern features in images based on a hierarchical extraction of semantic features. Semantic features are understood and interpreted by the segmentation deep learning model 51 on the basis of the deep learning model 51's own training, where the training includes feeding the deep learning model 51 detailed examples of various objects to be detected.

Subsequently, the series of annotated image frames 56 are input into a view transform sub-engine 58 which converts the series of annotated image frames 56 into an overhead Bird's Eye View (BEV) map 59 with the view transform sub-engine 58. More specifically, the view transform sub-engine converts the series of image frames (captured by the cameras 19-25) into an Inverse Perspective Mapping (IPM) image which creates a single overhead bird's eye view of the vehicle 11. It is noted that the view transform sub-engine 58 can alternatively be executed in between the input layer 53 and the one or more hidden layers 55, or between the hidden layers 55 and the output layer 57. In this case, the input to the view transform sub-engine 58 will be high dimensional tensors (i.e., mathematical objects describing latent features of the external environment) associated with the image frames 56 rather than the series of annotated image frames 56 themselves.

To transform the series of image frames to an IPM image, the view transform sub-engine 58 identifies vanishing points in the distorted views, using algorithms such as Random Sample Consensus (RANSAC), Hough transform, and Radon transform, and analyzes the orientation and convergence of lines present in the image frames. After identifying the vanishing points, a homography transformation is applied in order to map the image from its original perspective to the desired overhead bird's eye view perspective. The homography transformation maps points from one perspective to another without changing straight lines, using algorithms such as Direct Linear Transform (DLT) and RANSAC. Finally, to enhance the visual quality of the transformed image, interpolation methods fill in any missing data from the transformed image, and smoothing methods reduce high-frequency noise in the image to present a cleaner appearance of the transformed image. Interpolation methods include nearest-neighbor interpolation, bilinear interpolation, and bicubic interpolation, while smoothing methods include Gaussian smoothing, median filtering, and mean filtering. Additional adjustments can be made as desired to fine-tune parameters such as the angle of view and distortion correction.

The view transform sub-engine 58 retains the semantically-identified features from the series of annotated image frames 56. Therefore, the view transform sub-engine 58 outputs a BEV map 59 of the external environment of the vehicle 11 with semantic masks superimposed on digital replicas of the plurality of features that appear in the BEV map 59. All pixels associated with the same semantic class are grouped together, creating a semantic mask (i.e., a silhouette of every feature present in the BEV map 59). Thus, a semantic mask labels each pixel in the BEV map 59 according to the semantic class of a feature that a pixel is located on. Semantic classes include parking lines 15, pavement arrows 29, pillars (e.g., FIG. 4A), lane dividers (e.g., FIG. 4A), parking blocks 17, curbs (e.g., FIG. 4A), walls 26, parked vehicles 13, and pavement markings (e.g., FIG. 4A).

A vectorization post-processing module 61 takes the BEV map 59 as input. The vectorization post-processing module 61 includes two sub-engines: a polygon extraction sub-engine 63 and a polyline extraction sub-engine 65. The polygon extraction sub-engine 63 extracts polygon contours of the semantic masks in the BEV map 59. The polygon extraction sub-engine 63 uses routine contour extraction methods such as the square tracing algorithm, the Moore-Neighbor Tracing algorithm, the radial sweep algorithm, and the Theo Pavlidis algorithm.

Figure 3C:
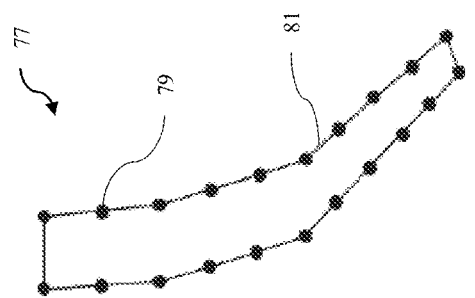
Figure 3B:
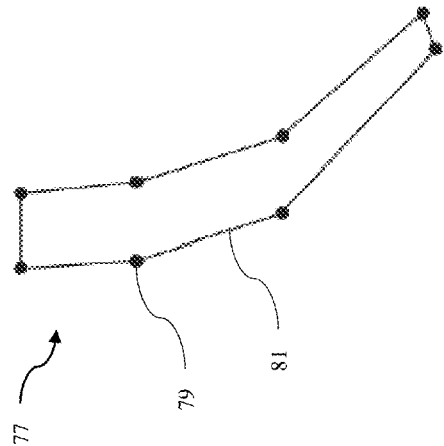

FIG. 3B provides an example embodiment of the extracted polygon contour(s) 77. The polygon contour 77 shown in FIG. 3B includes a plurality of vectors 81 which are connected by a series of points 79 along the polygon contour 77 of the semantic mask. For instance, an extracted polygon contour 77 of a rectangle would include four points 79 at the four corners of the rectangle and four vectors 81 connecting the four points 79 to create the shape of a rectangle. On the other hand, a shape such as a circle would have a large number of points 79 spaced close together with a similarly large number of vectors 81 connecting the points 79 to create a representation of a circle.

For polyline objects, which are features that are long and thin such as parking lines 15, lane dividers 75, curbs 71, and walls 26, the polyline extraction sub-engine 65 performs an additional algorithm explained below to extract the polylines from the polyline objects. For instance, the polygon extraction sub-engine will extract a thin rectangular contour for a parking line 15, and the polyline extraction sub-engine 65 will convert the rectangular contour into a series of connected vectors 81 in a polyline. Thicker features, such as pillars 69, pavement markings 73, and pavement arrows 29, are sufficiently defined by the polygon contours 77, and thus polylines are not extracted from the thicker features. To distinguish between polyline objects and polygons, the mapping engine 68 is configured to calculate a simple ratio of a polygon's width to its length (or vice versa), and determines that polygon contours with a ratio above or below a particular threshold are to be converted to polyline objects.

As shown in FIG. 3C, the polyline extraction sub-engine 65 begins by sampling additional points 79 with equal distance on the specific polygon contour 77. Additional points 79 are added at an equal distance between the points 79 on the specific polygon contour 77. For example, if the polygon contour 77 was a rectangle with four points 79 (one point at each corner of the rectangle), the number of points 79 could increase to eight points 79 on the polygon contour 77 of the rectangle, with the additional four points 79 being located in the middle of each vector 81. The number of points 79 added in the additional sampling depends on the amount of space available on the polygon contour 77 and the amount of points 79 previously sampled on the polygon contour 77.

Next, FIG. 3D shows how the Euclidean distance 83 between P 87 and every other point on the polygon contour 77 is calculated, where the current point being evaluated is denoted as P 87. Euclidean distance 83 refers to measuring the shortest distance between two points 79 (i.e., drawing a straight line connecting two points 79 and measuring the distance of the line), and may be colloquially referred to measurements "as the crow flies." In addition, the length on line 85 is calculated from P 87 and all other points 79. The length on line 85 measures the shortest distance following a perimeter of the polygon contour 77 from P 87 to another point 79 on the polygon contour 77 (i.e., measuring the distance along the perimeter of the polygon contour 77 from point P 87 to a second point). Because there are two directions that can be taken when measuring the length on line from P 87 to another point 79 (i.e., moving upward and downward from P 87 as shown by the length on line in FIG. 3D), the length on line used for subsequent calculations is the shorter of the two length on lines for any two points. That is, the length on line 85 is a shortest distance following a perimeter of the polygon contour from one point to another point.

After finding the Euclidean distances 83 and length on lines 85 between the current point P 87 and all other points 79, a ratio R of the Euclidean distance 83 and the length on line 85 is calculated. The value of R equates to the value of the Euclidean distance 83 divided by the length on line 85. FIG. 3E shows that a point Q 89 is determined as the point associated with a minimum R value, and Q 89 becomes a paired point with P 87.

FIG. 3F shows that by calculating the midpoint of the Euclidean distance between P 87 and Q 89, a center point C 91 is calculated. All previous steps are repeated until all center points C 91 are calculated, as shown in FIG. 3G. It is noted that the number of center points C 91 is less than that of the number of points 79 disposed on the polygon contour 77. In this way, when a previously measured point Q 89 becomes the current point P 87, the current point P 87 will have the same center point C 91 as was previously calculated. Thus, it is not necessary to repeat the calculation of center points C 91 for points 79 that are already paired with a second point 79.

After all the center points C 91 are calculated, FIG. 3H shows that all center points C 91 are connected by a series of vectors 81 to form a continuous polyline 93. The newly calculated polyline 93 replaces the previously extracted polygon contour 77 on the BEV map 59. After the polyline extraction sub-engine 65 extracts polylines 93 for all the polyline objects present in the BEV map 59, a vectorized map 67 is output from the mapping engine 68, which is also depicted in FIG. 3A. In the case that the vectorized map 67 was created on the server 43, the server 43 transmits the vectorized map 67 to the vehicle 11 by way of the data connection 45. If the vectorized map 67 is created onboard the vehicle 11, the vectorized map 67 can be uploaded to the server 43 and/or can remain on the vehicle 11 for the purpose of autonomous driving.

Turning to FIG. 4A, FIG. 4A shows an example of an alternative embodiment of an urban environment 12 that a vehicle 11 is disposed in. The urban environment 12 includes walls 26, curbs 71, pavement markings 73, parking lines 15, lane dividers 75, a pillar 69, and the vehicle 11. The pavement markings 73 in the urban environment 12 include handicapped parking symbols painted on the pavement as well as a plurality of striped painted lines on the pavement indicating that vehicles 11 cannot park at the marked location. The vehicle 11 includes cameras 19-25 which are configured to capture a series of images of the external environment of the vehicle, and an ECU 27 which can process and/or transmit the series of image frames to a server 43 in order to create a vectorized map of the external environment of the vehicle 11.

Figures 4B, 4C, 4D:
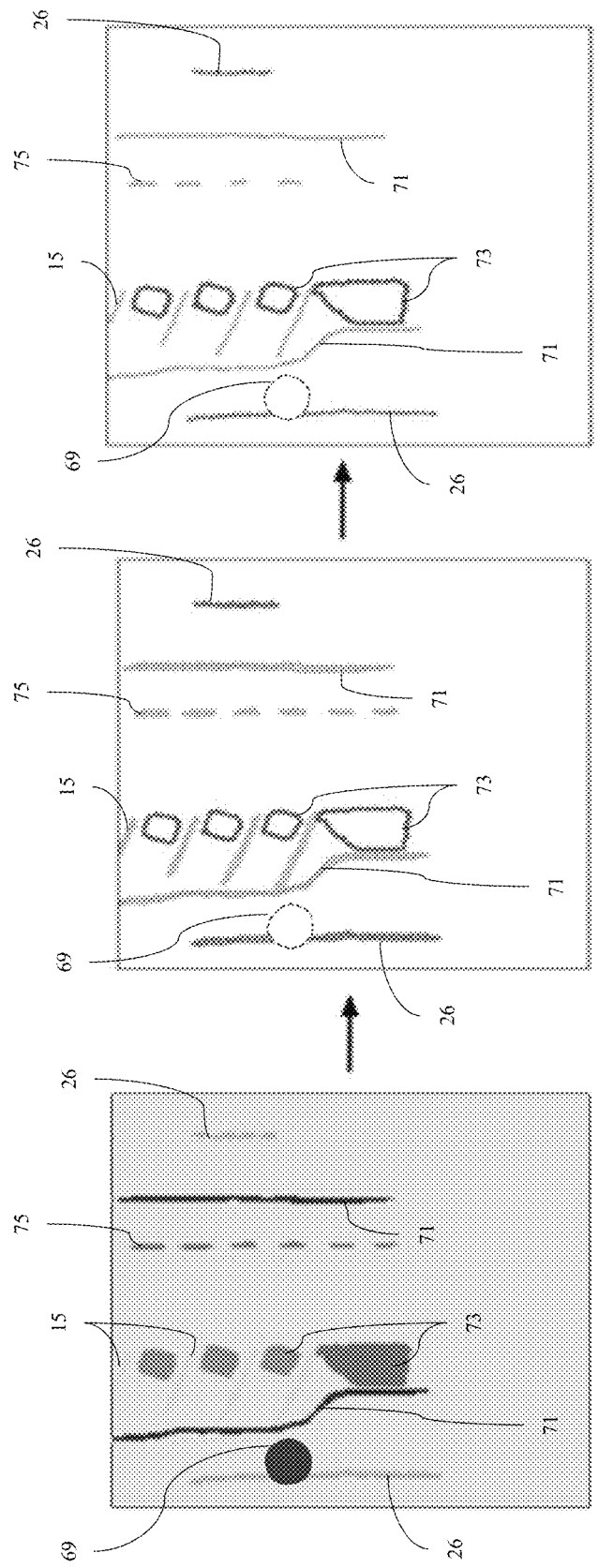

Turning to FIGS. 4B-4D, FIG. 4B shows an example embodiment of the urban environment 12 depicted in FIG. 4A as a BEV map 59. Semantic masks are superimposed on digital replicas of the plurality of features that appear in the BEV map 59. Each pixel in the BEV map 59 is labeled according to the semantic class of a feature that a pixel is located on, and all pixels associated with the same semantic class are grouped together. The semantic masks form a silhouette of the digital replicas of the plurality of features, as can be seen most clearly by the pillar 69 and the pavement markings 73. In addition, while more difficult to discern by the human eye, the walls 26, curbs 71, parking lines 15, and lane dividers 75 are not just lines as they might appear, but rather are filled in silhouettes. This becomes more apparent with respect to FIG. 4C as the contours of these thinner features are shown to be extracted.

Turning to FIG. 4C, FIG. 4C shows an example embodiment of the BEV map 59 after the polygon extraction sub-engine 63 of the vectorization post-processing module 61 extracts polygon contours 77 of the semantic masks from FIG. 4B. The polygon extraction sub-engine 63 uses classical contour extraction methods, including but not limited to, the square tracing algorithm, Moore-Neighbor Tracing algorithm, radial sweep algorithm, and Theo Pavlidis' algorithm.

Turning to FIG. 4D, FIG. 4D shows an example embodiment of a vectorized map 67. After the vectorization post-processing module 61 has extracted the plurality of polygon contours 77 as can be seen in FIG. 4C, the polyline extraction sub-engine 65 extracts polylines from specific polygon contours 77 of the plurality of polygon contours associated with polyline objects. Polyline objects include parking lines 15, parking blocks 17, walls 26, curbs 71, and lane dividers 75. As a result of the polyline extraction sub-engine 65, the polyline objects in FIG. 4D are thinner than the polyline objects in FIG. 4C. Thinner objects require less data points, thus the use of polylines to depict thin objects such as the lane dividers 75 fosters faster object detection when a vehicle 11 utilizes a resultant vectorized map 67.

Figure 5:
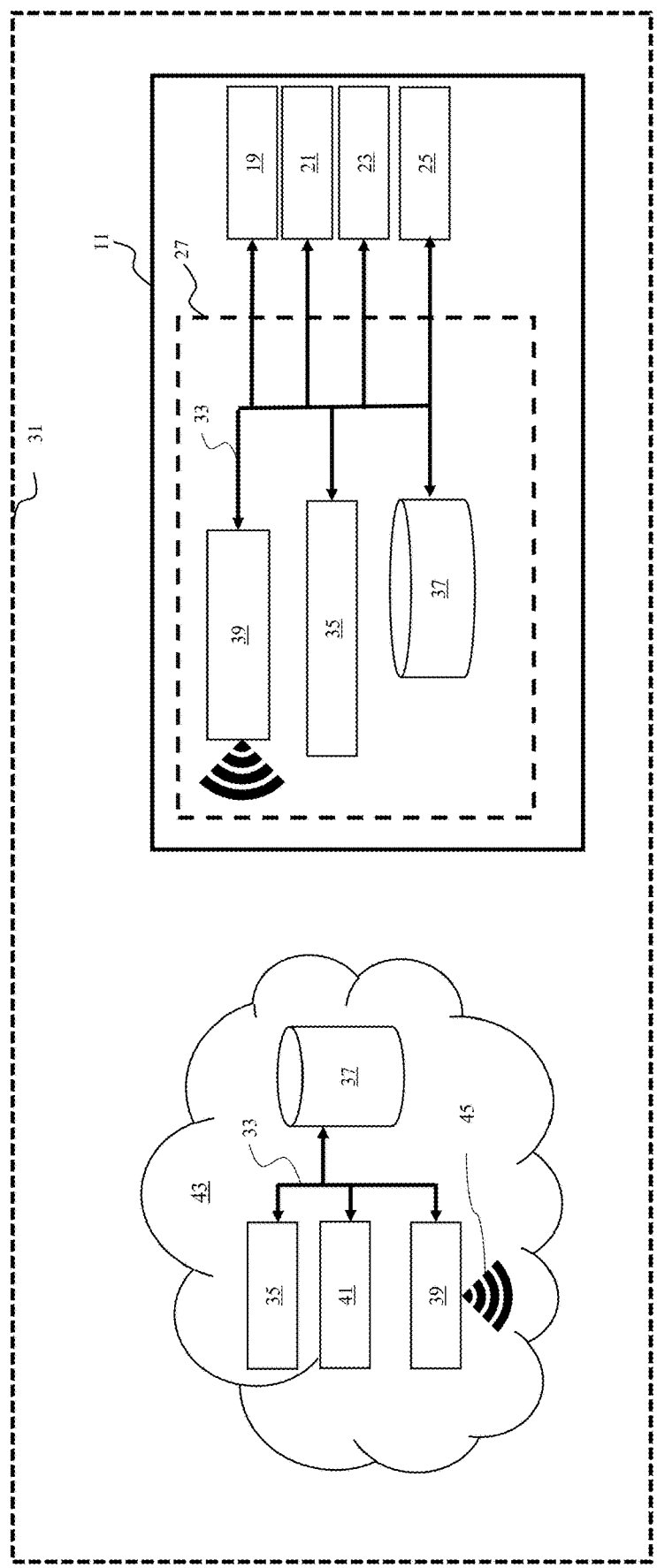
FIG. 5 depicts a system in accordance with one or more embodiments disclosed herein.

FIG. 5 shows an example of a system in accordance with one or more embodiments disclosed herein. As depicted in FIG. 5, the system 31 includes a vehicle 11 and a server 43. The vehicle 11 may be a passenger car, a bus, or any other type of vehicle 11. As shown in FIG. 5, the vehicle 11 includes a first camera 19, a second camera 21, a third camera 23, and a fourth camera 25. The vehicle 11 additionally includes an ECU 27, where the ECU 27 includes a transceiver 39, a CPU 35, and a memory 37. The cameras 19-25 and the components of the ECU 27 are connected by way of a data bus 33.

The cameras 19-25 are image sensors 47 depicted as cameras. The cameras 19-25 may alternatively be embodied as Light Detection and Ranging (LiDAR) sensors, radar sensors, ultrasonic sensors, or infrared sensors without departing from the nature of the specification. Additionally, alternate embodiments of the vehicle 11 are not limited to comprising only four cameras 19-25, and may include more or less than four image sensors 47 or a combination of the alternative image sensors 47 listed above. The cameras 19-25 are configured to capture a series of image frames that include a view comprising features disposed in an external environment of the vehicle 11. The features disposed in the external environment of the vehicle 11, as previously discussed with regard to FIGS. 1 and 4A-4D, may include, but are not limited to, parking lines 15, pavement arrows 29, pillars 69, lane dividers 75, parking blocks 17, curbs 71, walls 26, parked vehicles 13, and pavement markings 73. Further, the cameras 19-25 capture the series of image frames in the visible light wavelength and/or the infrared light wavelength.

The memory 37 is configured to store a mapping engine 68 which is formed by computer readable code. In addition, the memory 37 includes a non-transient storage medium, such as flash memory, Random Access Memory (RAM), a Hard Disk Drive (HDD), a solid state drive (SSD), a combination thereof, or equivalent. The computer readable code may, for example, be written in a language such as C++, C#, Java, MATLAB, or equivalent computing languages suitable for creating a vectorized map of an external environment of a vehicle 11. The CPU 35 is formed by one or more processors, integrated circuits, microprocessors, or equivalent computing structures that serve to execute the computer readable instructions that form the mapping engine (e.g., FIG. 3A) stored on the memory 37. Finally, the transceiver 39 performs both data transmission and data reception process, such that the transceiver 39 encompasses the functions of a transmitter and a receiver in a single package. In this way, the transceiver 39 includes an antenna (such as a monitoring photodiode) and a light source such as an LED, for example. Alternatively, the transceiver 39 may be split into a transmitter and receiver, where the receiver serves to receive data from the server 43, and the transmitter serves to transmit data to the server 43.

The server 43 includes the same components as the ECU 27 of the vehicle 11, with the addition of a GPU 41. The GPU 41 is a specialized electronic circuit that increases the speed and efficiency of processing the series of image frames of the external environment of the vehicle 11. The ECU 27 of the vehicle 11 may optionally include a GPU 41 as well. Data is shared between the server 43 and the vehicle 11 by way of a wireless data connection 45 that allows for the transfer of data between the server 43 and the vehicle 11. To this end, the wireless data connection 45 may be embodied as a cellular data connection (e.g., 4G, 4G LTE, 5G, and contemplated future cellular data connections such as 6G). Alternatively, the wireless data connection 45 may include forms of data transmission including Bluetooth, Wi-Fi, Wi-Max, Vehicle-to-Vehicle (V2V), Vehicle-to-Everything (V2X), satellite data transmission, or equivalent data transmission protocols.

While the series of image frames of the external environment of the vehicle 11 are captured by the cameras 19-25 onboard the vehicle 11, the mapping engine 68 may be hosted on either the ECU 27 of the vehicle 11 and/or the server 43. In the case that the server 43 is designated to create the vectorized map, the server 43 receives a series of image frames that include a view comprising features disposed in the external environment of the vehicle 11 captured by the cameras 19-25. The series of image frames are received on the server 43 via the data connection 45. The memory 37 of the server stores the mapping engine 68 in the form of computer-readable code which is processed by the CPU 35 and the GPU 41 of the server 43. Thus, the series of images are processed through the mapping engine 68 to form a vectorized map, and the transceiver 39 of the server 43 transmits the vectorized map to the vehicle 11 through the data connection 45.

Figure 6:
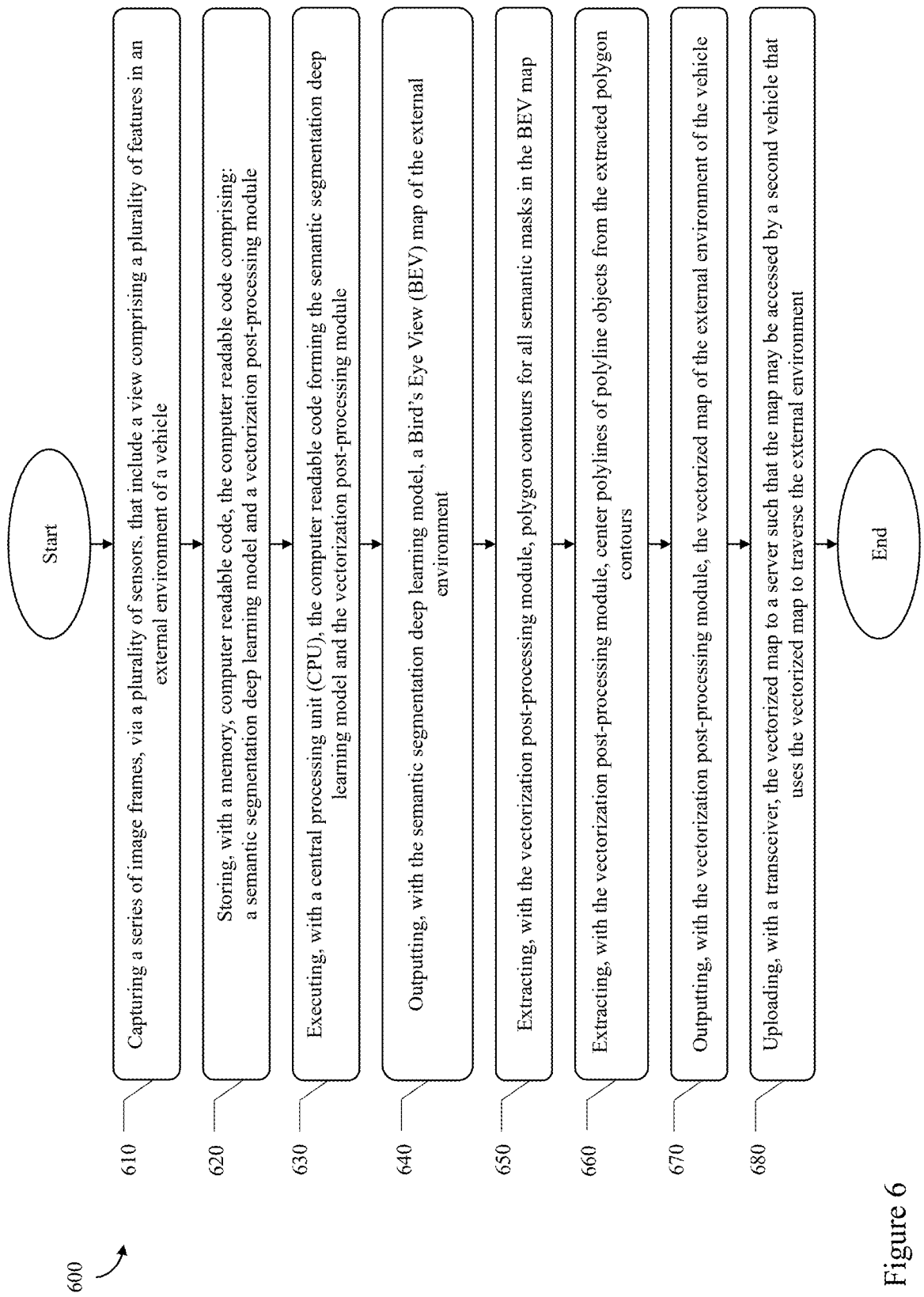
FIG. 6 depicts a flowchart of a process for creating online vectorized maps for autonomous vehicles in accordance with one or more embodiments disclosed herein.

FIG. 6 depicts a method 600 for creating a vectorized map for a vehicle 11 in accordance with one or more embodiments of the invention. While the various blocks in FIG. 6 are presented and described sequentially, one of ordinary skill in the art will appreciate that some or all of the blocks may be executed in a different order, may be combined or omitted, and some or all of the blocks may be executed in parallel and/or iteratively. The blocks can encompass multiple actions and/or multiple blocks may be performed in the same physical action. Furthermore, the blocks may be performed actively or passively.

The method of FIG. 6 initiates at Step 610, which includes capturing a series of image frames depicting a view of a plurality of features in an external environment of a vehicle 11. The series of image frames are captured by way of at least one image sensor 47. As described above, the image sensors 47 may include cameras, Light Detection and Ranging (LiDAR) sensors, radar sensors, ultrasonic sensors, or infrared sensors without departing from the nature of the specification.

In Step 620, a memory 37 stores computer readable code including a semantic segmentation deep learning model 51 and a vectorization post-processing module 61. The memory 37 may be formed as a non-transient storage medium such as RAM, for example. The semantic segmentation deep learning model 51 includes a camera encoder 52, an input layer 53, one or more hidden layers 55, and an output layer 57. The vectorization post-processing module 61 includes a polygon extraction sub-engine 63 and a polyline extraction sub-engine 65.

Step 630 includes executing, with a central processing unit (CPU) 35, the computer readable code forming the semantic segmentation deep learning model 51 and the vectorization post-processing module 61. The CPU 35 is formed by one or more processors, integrated circuits, microprocessors, or equivalent computing structures. The semantic segmentation deep learning model 51 and the vectorization post-processing module 61 form the mapping engine 68 which can be hosted on the ECU 27 of the vehicle 11 and/or on the server 43. Functionally, the deep learning model 51 serves to output a BEV map 59 of the external environment of the vehicle with semantic masks superimposed on digital replicas of the plurality of features that appear in the BEV map 59. The vectorization post-processing module 61 also serves to output a vectorized map 67 comprising a plurality of polygon contours 77 and polylines 93 in place of the features disposed in the external environment of the vehicle 11.

In Step 640, the semantic segmentation deep learning model 51 outputs a Bird Eye's View (BEV) map 59 of the external environment of the vehicle 11 with semantic masks superimposed on digital replicas of the plurality of features that appear in the BEV map 59. Semantic masks label each pixel in the BEV map 59 according to the semantic class of a feature that a pixel is located on. All pixels associated with the same semantic class are grouped together, creating a semantic mask (i.e., a silhouette of every feature present in the BEV map 59). Semantic classes include parking lines 15, pavement arrows 29, pillars 69, lane dividers 75, parking blocks 17, curbs 71, walls 26, parked vehicles 13, and pavement markings 73.

In Step 650, the vectorization post-processing module 61 extracts polygon contours 77 for all the semantic masks in the BEV map 59. The polygon contours 77 are extracted by classical contour extraction methods, including but not limited to, a square tracing algorithm, Moore-Neighbor Tracing algorithm, radial sweep algorithm, and Theo Pavlidis' algorithm. The extracted polygon contours 77 include a plurality of vectors 81 which are connected by a series of points 79 along the polygon contour 77 of the semantic mask.

Step 660 includes extracting, with the vectorization post-processing module, center polylines 93 of polyline objects from the extracted polygon contours 77. Polyline objects include parking lines 15, parking blocks 17, walls 26, curbs 71, and lane dividers 75. Polyline objects can be described as "long and thin," and can easily be represented as a line. By representing long, thin polygons as polylines, vectorized maps created with polylines may be used for faster localization by a vehicle 11, as the vehicle 11 processes fewer input data points.

Step 670 includes outputting, with the vectorization post-processing module, a vectorized map 67 of the external environment of the vehicle. The vectorized map 67 includes polygon contours 77 and polylines 93 that represent the features disposed in the external environment of the vehicle 11. The vectorized map 67 can be used by the vehicle 11 to traverse the external environment while the vehicle 11 is driving in an autonomous driving mode.

Finally, Step 680 includes uploading, with a transceiver 39, the vectorized map 67 to a server 43 such that the vectorized map 67 can be accessed by a second vehicle that uses the vectorized map 67 to traverse the external environment. The vehicle 11 and the server 43 are connected by way of a data connection 45. In addition, the mapping engine 68 that creates the vectorized map 67 may be hosted on the server 43, in which case the vehicle 11 would not need to upload the vectorized map 67 to the server 43.

Figure 7:
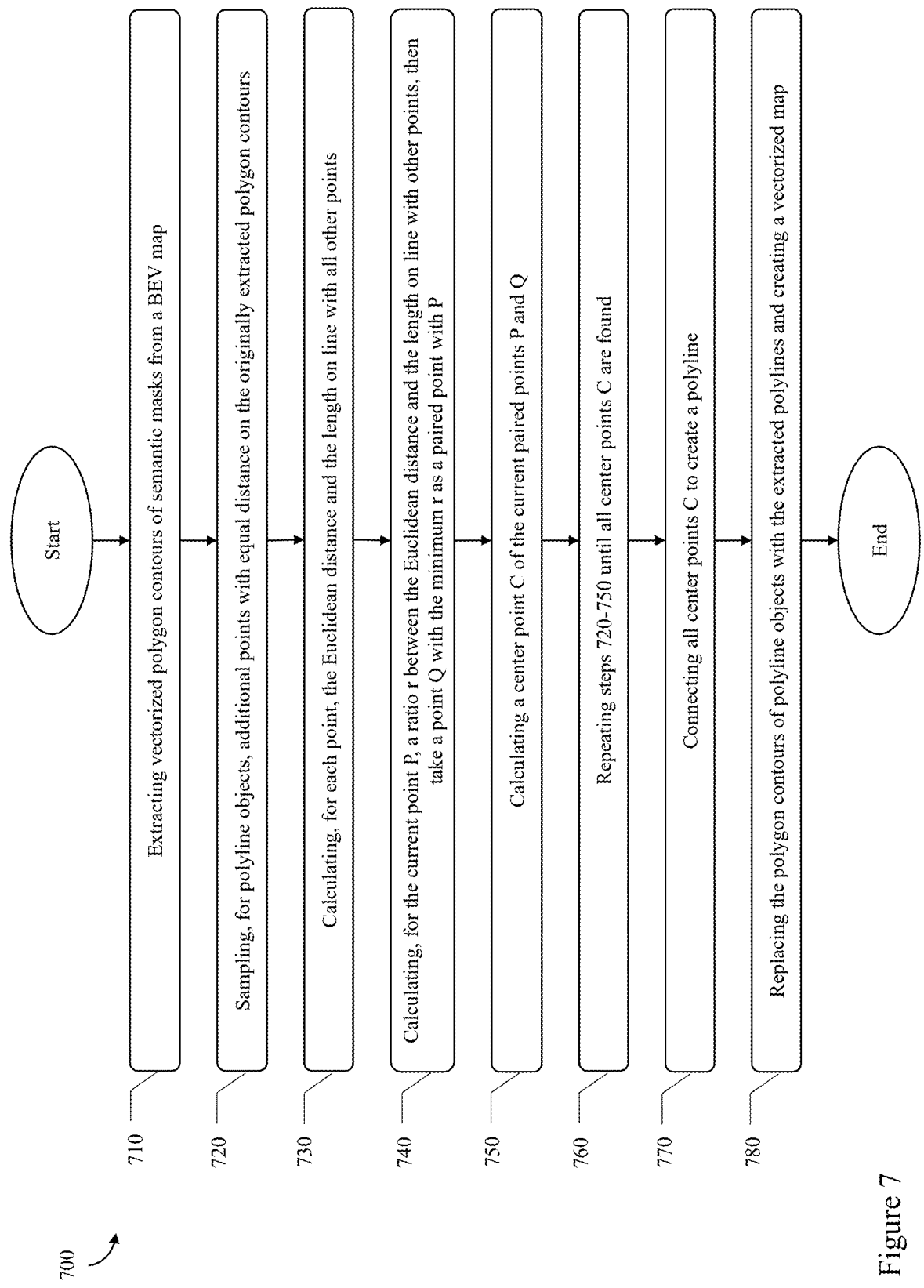
FIG. 7 depicts a flowchart of a process for extracting polylines from polygon contours of polyline objects in accordance with one or more embodiments disclosed herein.

Turning to FIG. 7, FIG. 7 depicts a method 700 for the vectorization post-processing module to extract polygon contours 77 and polylines 93 from a BEV map 59 comprising semantic masks of the features present in the BEV map 59. While the various blocks in FIG. 7 are presented and described sequentially, one of ordinary skill in the art will appreciate that some or all of the blocks may be executed in a different order, may be combined or omitted, and some or all of the blocks may be executed in parallel and/or iteratively. The blocks can encompass multiple actions and/or multiple blocks may be performed in the same physical action. Furthermore, the blocks may be performed actively or passively.

The method of FIG. 7 initiates at Step 710, which includes extracting, with the polygon extraction sub-engine 63, vectorized polygon contours 77 of semantic masks from a BEV map 59. The polygon extraction sub-engine 63 uses classical contour extraction methods, including but not limited to, the square tracing algorithm, Moore-Neighbor Tracing algorithm, radial sweep algorithm, and Theo Pavlidis' algorithm. An extracted polygon contour 77 example is shown in FIG. 3B.

Step 720 includes sampling, with the polyline extraction sub-engine 65, additional points 79 with equal distance on the originally extracted polygon contours 77 of polyline objects. Polyline objects include parking lines 15, lane dividers 75, curbs, 71, and walls 26, which can be described as long and thin features. On the other hand, features which remain as polygon contours 77 are referred to as polygon classes, which include pillars 69, pavement markings 73, and pavement arrows 29. Features disposed in the external environment of the vehicle are classified as polygon classes or polyline objects by the semantic segmentation deep learning model 51. Polylines 93 cannot be extracted from polygon classes because doing so would deviate from the intended meaning of the feature. For example, if a pavement arrow 29 were to be extracted as a polyline 93, the arrow would no longer serve a purpose as the direction the pavement arrow 29 points would no longer be discernible. Similarly, a pavement marking 73, such as a "do not park" area would depart from its intended meaning if it were a polyline 93, as the area in which a vehicle 11 cannot park in would no longer be recognized on the vectorized map 67. An example of sampling additional points 79 along a polygon contour 77 is shown in FIG. 3C.

In Step 730, a Euclidean distance 83 and a length on line 85 is calculated between a first point and all other points 79 on the polygon contour 77. The Euclidean distance 83 is the shortest distance between two points 79 (i.e., drawing a straight line connecting two points 79 and measuring the distance of the straight line). The length on line 85 is calculated by measuring the shortest distance following the perimeter of the polygon contour 77 from point P 87 to all other points 79 on the polygon contour 77 (i.e., measuring the distance along the perimeter of the polygon contour 77 from point P 87 to a second point). Visual representations of measuring the Euclidean distance 83 and the length on line 85 are shown in FIGS. 3D and 3E.

Step 740 includes calculating, for a first point P, a ratio R of the Euclidean distance 83 and the length on line 85 between all other points 79 to determine a paired point Q 89. The point Q 89 corresponds to a second point 79 that has a minimum value of R with the first point P. The value of R equates to the value of the Euclidean distance 83 divided by the length on line 85. An example of point Q 89 is shown in FIGS. 3E and 3F.

In Step 750, a center point C 91 of the paired points P 87 and Q 89 is calculated. C 91 is calculated by finding the midpoint between points P 87 and Q. A midpoint of two points 79 can be determined by drawing a straight line between the two points 79 and plotting a point C 91 on the line a distance that is equidistant from the two points, in the center of the straight line. An example of determining the center point C 91 is shown in FIG. 3F.

Step 760 includes repeating Steps 720-750 until all center points C 91 are calculated. It is noted that the number of center points C 91 is less than that of the number of points 79 disposed on the contour. In this way, when a previously measured point Q 89 becomes a point P 87, the now point P 87 will have the same center point C 91 as was previously calculated. Thus, it is not necessary to repeat the calculation of center points C 91 for points 79 that had previously been measured as a point Q 89. An example of finding all the center points C 91 is shown in FIG. 3G.

In Step 770, all the center points C 91 are connected to create a center polyline 93. The polyline 93 is formed by a connected series of vectors 81. After connecting all of the center points C 91, a centerline, or polyline 93 is formed on the interior of the previously determined polygon contour 77. An example of connecting all the center points C 91 with vectors 81 to form a center polyline 93 is shown in FIG. 3H.

Finally, Step 780 includes replacing the polygon contours 77 of polyline objects with the extracted center polylines 93 and creating a vectorized map 67 of the external environment of the vehicle 11. The vectorized map 67 includes polygon contours 77 and polylines 93, and the semantic masks are removed. An example of a vectorized map 67 is shown in FIG. 4D.

Accordingly, the aforementioned embodiments of the invention as disclosed relate to systems and methods useful in creating online vectorized maps for autonomous vehicles, thereby creating accessible and up-to-date maps for navigational and autonomous driving purposes. In addition, and as discussed herein, vectorized maps created by the semantic segmentation deep learning model are able to be quickly processed by vehicles when compared to vector maps containing only polygons. In this way, vector maps formed with polylines as described herein are beneficial for allowing a vehicle to quickly and effectively be localized in its surrounding environment.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

Although only a few example embodiments have been described in detail above, those skilled in the art will readily appreciate that many modifications are possible in the example embodiments without materially departing from the invention. For example, the mapping engine may be hosted on either the server and/or the ECU of the vehicle. Further, the at least one image sensor is not limited to four cameras that capture a plurality of video feeds of the external environment of the vehicle, but may, for example, include a LiDAR sensor configured to capture a spatial representation of the external environment of the vehicle. Accordingly, all such modifications are intended to be included within the scope of this disclosure as defined in the following claims.

What is claimed is:

1. A system for creating online vectorized maps for autonomous vehicles, the system comprising:
    at least one image sensor configured to capture a series of image frames that include a view comprising a plurality of features disposed in an external environment of a vehicle; and
    an electronic control unit (ECU), the ECU comprising:
        a memory configured to store computer readable code, the computer readable code comprising:
            a semantic segmentation deep learning model; and
            a vectorization post-processing module;
        a central processing unit (CPU) configured to execute the computer readable code forming the semantic segmentation deep learning model and the vectorization post-processing module, where the computer readable code causes the CPU to:
            output, with the semantic segmentation deep learning model, a Bird's Eye View (BEV) map of the external environment of the vehicle with semantic masks superimposed on digital replicas of the plurality of features that appear in the BEV map;
            extract, with the vectorization post-processing module, polygon contours for all the semantic masks in the BEV map;
            extract, with the vectorization post-processing module, center polylines of polyline objects from the polygon contours; and
            output, with the vectorization post-processing module, the vectorized map of the external environment of the vehicle; and
        a transceiver configured to upload the vectorized map to a server such that the vectorized map can be accessed by a second vehicle that uses the vectorized map to traverse the external environment.

2. The system of claim 1, wherein the at least one image sensor comprises four cameras configured to capture a plurality of video feeds of the external environment of the vehicle.

3. The system of claim 2, wherein the semantic segmentation deep learning model creates the BEV map by converting the plurality of video feeds captured by the four cameras or high dimensional tensors associated with the plurality of video feeds into an Inverse Perspective Mapping (IPM) image using algorithms including at least one of: Random Sample Consensus (RANSAC), Hough transform, Radon transform, Direct Linear Transform (DLT), nearest neighbor interpolation, bilinear interpolation, bicubic interpolation, Gaussian smoothing, median filtering, and mean filtering.

4. The system of claim 1, wherein the plurality of features disposed in the external environment of the vehicle are classified by the semantic segmentation deep learning model as comprising polygon classes or polyline objects.

5. The system of claim 1, wherein the memory comprises a non-transient storage medium.

6. The system of claim 1, wherein the vectorization post-processing module samples additional points with equal distance on the polygon contour for the polygon contours associated with the polyline objects.

7. The system of claim 1, wherein the vectorization post-processing module is configured to calculate a Euclidean distance between two points on a particular polygon during the process of extracting the center polylines of the polyline objects from the polygon contours.

8. The system of claim 1, wherein the vectorization post-processing module is configured to calculate a length on line between all points on the polygon contour during the process of extracting the center polylines of the polyline objects from the polygon contours, wherein the length on line is a shortest distance following a perimeter of the polygon contour from one point to another point.

9. The system of claim 1, wherein the vectorization post-processing module is configured to calculate a ratio between a Euclidean distance and a length on line for all points on the polygon contour during the process of extracting the center polylines of the polyline objects from the polygon contours, wherein two of the points are paired together when the ratio is a minimum value of all the ratios calculated.

10. The system of claim 9, wherein a center point between each of the paired points is calculated, and the center points of all the paired points are connected to form a center polyline during the process of extracting the center polylines of the polyline objects from the polygon contours.

11. The system of claim 10, wherein the vectorization post-processing module is configured to replace the polygon contour on the vectorized map with its respective center polyline.

12. A method for creating online vectorized maps for autonomous vehicles, the method comprising:
    capturing a series of image frames, via a plurality of sensors, that include a view comprising a plurality of features in an external environment of a vehicle;
    storing, with a memory, computer readable code, the computer readable code comprising:
        a semantic segmentation deep learning model; and
        a vectorization post-processing module;
    executing, with a central processing unit (CPU), the computer readable code forming the semantic segmentation deep learning model and the vectorization post-processing module, where the computer readable code comprises:
        outputting, with the semantic segmentation deep learning model, a Bird's Eye View (BEV) map of the external environment of the vehicle with semantic masks superimposed on digital replicas of the plurality of features that appear in the BEV map;
        extracting, with the vectorization post-processing module, polygon contours for all the semantic masks in the BEV map;
        extracting, with the vectorization post-processing module, center polylines of polyline objects from the polygon contours; and
        outputting, with the vectorization post-processing module, the vectorized map of the external environment of the vehicle; and
    uploading, with a transceiver, the vectorized map to a server such that the vectorized map can be accessed by a second vehicle that uses the vectorized map to traverse the external environment.

13. The method of claim 12, further comprising: capturing, with four cameras, a plurality of video feeds of the external environment of the vehicle.

14. The method of claim 13, further comprising: creating the BEV map, via the semantic segmentation deep learning model, by converting the plurality of video feeds captured by the four cameras or high dimensional tensors associated with the plurality of video feeds into an Inverse Perspective Mapping (IPM) image using algorithms including Random Sample Consensus (RANSAC), Hough transform, Radon transform, Direct Linear Transform (DLT), nearest neighbor interpolation, bilinear interpolation, bicubic interpolation, Gaussian smoothing, median filtering, and mean filtering.

15. The method of claim 12, further comprising: sampling, with the vectorization post-processing module, additional points with equal distance on the polygon contour.

16. The method of claim 12, further comprising: calculating, with the vectorization post-processing module, a Euclidean distance between all points on the polygon contour, wherein the Euclidean distance is a shortest distance between two of the points on the polygon contour.

17. The method of claim 12, further comprising: calculating, with the vectorization post-processing module, a length on line between all points on the polygon contour, wherein the length on line is a shortest distance following a perimeter of the polygon contour from one point to another point.

18. The method of claim 12, further comprising: calculating, with the vectorization post-processing module, a ratio between a Euclidean distance and a length on line for all points on the polygon contour, wherein two of the points are paired together when the ratio is a minimum value of all the ratios calculated.

19. The method of claim 18, further comprising: calculating, with the vectorization post-processing module, a center point between each of the paired points and connecting all center points with vectors to form a center polyline.

20. The method of claim 19, further comprising: replacing the polygon contour of a polyline object with the center polyline on the vectorized map.

* * * * *